No. 853,986. PATENTED MAY 21, 1907.
J. T. LUDLOW & D. MOSHER.
CONTINUOUS BOILING OUT STILL.
APPLICATION FILED APR. 18, 1904.
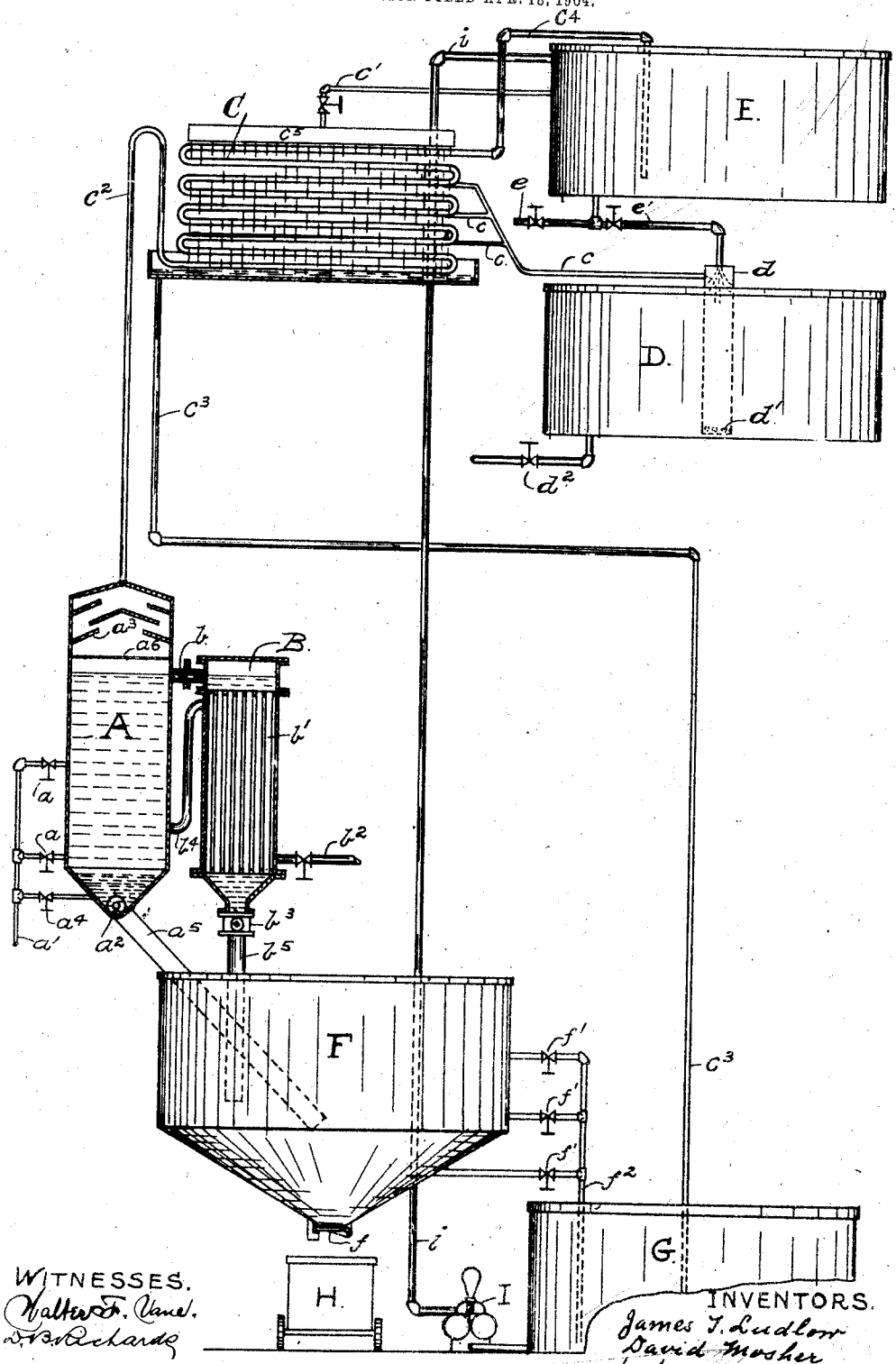

UNITED STATES PATENT OFFICE.

JAMES T. LUDLOW AND DAVID MOSHER, OF SAN FRANCISCO, CALIFORNIA.

CONTINUOUS BOILING-OUT STILL.

No. 853,986.      Specification of Letters Patent.      Patented May 21, 1907.

Application filed April 18, 1904. Serial No. 203,536.

*To all whom it may concern:*

Be it known that we, JAMES T. LUDLOW and DAVID MOSHER, citizens of the United States, residing at the city and county of San Francisco, State of California, have invented certain new and useful Improvements in Continuous Boiling-Out Stills; and we do hereby declare the following to be a full, clear, and exact description of the same.

Our invention relates to the class of apparatus used in the ammonia-cyanid process of treating copper, nickel or zinc ores containing precious metals, and particularly to an apparatus adapted for use in connection with that process secured to the said Mosher by Letters Patent of the United States No. 730,835, granted June 9th, 1903.

As economy in operation, and initial low cost of plant are of the utmost importance in the profitable development and handling of low grade ore-bodies, the general purpose of our invention is to secure these results by an apparatus in which a continuous boiling out of the metal oxid, and the recovery of the ammonia are possible; while, at the same time, by the employment, in connection with the boiling-out still, of a heat interchanger, such as we shall describe, the heat units from the waste hot boiled-out solution are utilized, thus effecting important economy. In addition to the advantages flowing from these considerations the apparatus is of such a nature that by its continuous action, the expensive construction of boiling-out stills of huge dimensions such as heretofore proposed is avoided, and we are able to handle, in twenty-four hours, large volumes of solution from hundreds of tons of ore, in a still of small cubic capacity, the size of which is, in itself, an item in the saving of constructive expense.

Our invention consists, in general terms, of an apparatus the chief feature of which is a boiling out still, having such connections that during the process of boiling out to liberate the ammonia from the solution and to precipitate the metal oxid, the metal oxid ammonia solution is supplied to the still and the waste hot boiled out solution is discharged from the still, in a continuous flow or operation.

Our invention further consists of a boiling out still and an associated heat interchanger relatively connected in such manner that the waste hot boiled-out solution from the still passes through the heat interchanger and gives up its heat to the incoming metal-oxid solution which passes through the interchanger to the still; the ammonia gas meanwhile passing from the still to the condenser and absorber to be returned to the supply of metal solvent for use over and over again.

Our invention also consists in the novel apparatus which we shall now describe by reference to the accompanying drawings in which the figure is a general view of our apparatus.

A is the boiler or still in which the metal oxid ammonia solution is boiled, the ammonia liberated and the boiled-out metal oxid precipitated. With this still are made the valve controlled connections $a$, from the steam pipe $a'$, by which connections steam is let into the still for boiling the solution. In the top of the still are the baffle plates $a^3$, below which is a screen $a^6$, to prevent violent boiling or foaming. In the lower portion of the still is a worm $a^2$, adapted to be run by power or by hand, for removing the precipitate and discharging it into the chute $a^5$, which passes down into the settling tank F. Into the lower portion of the still is let, from steam pipe $a'$, a valve controlled pipe $a^4$, to admit steam to the still to stir up the precipitate.

B is the heat interchanger. It consists of a suitable casing the upper head of which has a connection $b$ with the still, by which connection the hot-boiled-out solution from the still passes over to the heat interchanger. In the latter are tubes $b'$ through which the hot-boiled-out solution passes to the base of the device from which, by a pipe $b^5$, it is conducted to the settling tank F, said pipe being controlled by the valve $b^3$.

From leaching tanks, barrels, etc., not herein shown, and which constitute the source of supply of the metal solution from the ore, extends a pipe $b^2$ to the lower portion of the heat interchanger casing, whereby said solution is passed into said interchanger, and flowing upwardly around and in contact with its tubes $b'$ passes therefrom by the pipe $b^4$ into the lower portion of the still. It will thus be seen that the heat interchanger comprises separate passages in proximity, the waste hot boiled-out solution from the still flowing through one passage and through the heat interchanger, and giving up its heat to the incoming cold ammonia-metal oxid solution, which continually flows through the other passage of the interchanger, and said solution when introduced, by the pipe $b^4$, into the still, is thus already heated to a large extent.

C is the condenser for the ammonia gas and water vapor from the still. This condenser is connected with the still by the pipe $c^2$, and it has drain pipes $c$, the continuation of which connects with the absorbing drum $d$ of the tank D, which holds the aqua-ammonia solution. The condenser is supplied with cold water from the tank E through the connection $c'$. From the lower portion of the condenser extends the water overflow pipes $c^3$ leading to the tank G below. A pipe $c^4$ from the condenser carries off the non-condensible vapors, while the top of the condenser is provided with a water distributer $c^5$. The absorbing drum $d$ discharges through holes $d'$ in its lower portion into the tank D, and from said tank the pipe $d^2$ leads back again to the leaching-tanks, barrels, etc., containing ore or tailings.

The water tank E has a pipe $e'$ which supplies the absorber and a pipe $e$ for a general supply for washing the ore.

The settling tank F has a gate $f$ for drawing off the precipitate, and valve-controlled pipes $f''$ connected with a pipe $f^2$ for drawing off the clear liquid. In the storage tank G the liquid is allowed to cool.

H is a car under the settling tank to carry away the precipitate.

I is a pump to supply water through the pipe $i$ to the tank E.

It will thus be seen that the ammonia gas driven off in the still is condensed and returned to the stock solutions for use over and over again in dissolving the ammonia-soluble metals from the ores. In the process of treating copper, nickel and zinc ores with gold and silver values, as described in the patent referred to, the idea is first to transform the metals such as copper, nickel or zinc, present in whatever form in the ore, into a condition soluble in ammonia solutions of varying strengths; leaching such ammonia, copper, nickel or zinc solutions from the ore by known methods, and under conditions which will, as much as possible, prevent loss of ammonia; then by boiling the ammonia solution of metal hydroxid, carbonate or sulfate the metal is precipitated as oxid at the boiling point of water, and is thereby practically rendered anhydrous. The ammonia passes over as vapor to be reabsorbed by cold water or cold boiled out waste solution for use with slight loss, over and over again.

The apparatus which we have herein described accomplishes the metal oxid precipitation, and ammonia recovery in such an economical and continuous manner, with large output for the small cubic capacity and compactness of the still, as to make it of great value in the treatment of ores by the ammonia and ammonia-cyanid processes.

Having thus described our invention, what we claim as new and desire to secure by Letters Patent, is—

1. In an apparatus of the class described, the combination with a continuous boiling out still having a discharge for metal oxid precipitate, an outlet for ammonia gas, an inlet below for ammonia metal oxid solution, and an outlet above for the discharge of hot boiled out solution, of a heat interchanger comprising separate passages in proximity, separate connections with said passages to receive in one the waste hot boiled out solution from the still, and to deliver from the other to the still the ammonia metal oxid solution to be treated, a discharge outlet for the boiled out solution, an inlet for the ammonia metal oxid solution, and means for continuously supplying ammonia metal oxid solution to the heat interchanger, whereby the boiled out solution passes from the still downward through the heat interchanger and is cooled, and the ammonia metal oxid passes upward through the heat interchanger and is heated before entering the still.

2. In an apparatus of the class described, the combination of a continuous boiling out still having a discharge for metal oxid precipitate and an outlet for ammonia gas, a heat interchanger having separate passages in proximity, and separate connections between said passages and the still for receiving in the one the waste hot boiled out solution from the still, and delivering from the other to the still the ammonia metal oxid solution to be treated, a connection from the source of said solution with the last named passage, and a discharge for the boiled out solution from the other passage, a condenser for the ammonia gas, an absorber in connection therewith, a tank for receiving the boiled out solution from the heat interchanger, and means for conveying said boiled out solution from said tank to the condenser to be used as a cooling medium therefor.

3. In an apparatus of the class described, the combination of a continuous boiling out still having a discharge for metal oxid precipitate and an outlet for ammonia gas, a heat interchanger having separate passages in proximity, and separate connections between said passages and the still for receiving in the one the waste hot boiled out solution from the still, and delivering from the other to the still the ammonia metal oxid solution to be treated, a connection from the source of said solution with the last named passage, and a discharge for the boiled out solution from the other passage, a condenser for the ammonia gas, an absorber in connection therewith, a tank for receiving the boiled out solution from the heat interchanger, means for conveying said boiled out solution from said tank to the condenser for a cooling medium, and means for conveying the boiled out solution from the tank to the absorber.

In witness whereof we have hereunto set our hands.

JAMES T. LUDLOW.
DAVID MOSHER.

Witnesses:
WALTER F. VANE,
D. B. RICHARDS.